US 9,852,715 B2

(12) United States Patent
Wang

(10) Patent No.: US 9,852,715 B2
(45) Date of Patent: Dec. 26, 2017

(54) ELECTRONIC PAPER DISPLAY APPARATUS

(71) Applicant: Triple Power Limited, Taipei (TW)

(72) Inventor: Fu-Ming Wang, Taipei (TW)

(73) Assignee: Triple Power Limited, Taipei (TW)

( * ) Notice: Subject to any disclaimer, the term of this patent is extended or adjusted under 35 U.S.C. 154(b) by 0 days.

(21) Appl. No.: 15/581,175

(22) Filed: Apr. 28, 2017

(65) Prior Publication Data
US 2017/0316760 A1    Nov. 2, 2017

(30) Foreign Application Priority Data

Apr. 29, 2016  (TW) .............................. 105113570 A

(51) Int. Cl.
G09G 5/22      (2006.01)
G09G 3/34      (2006.01)
G01S 19/13     (2010.01)
G06F 21/32     (2013.01)

(52) U.S. Cl.
CPC ................ *G09G 5/22* (2013.01); *G01S 19/13* (2013.01); *G06F 21/32* (2013.01); *G09G 3/3453* (2013.01); *G09G 2330/021* (2013.01); *G09G 2370/04* (2013.01); *G09G 2370/16* (2013.01)

(58) Field of Classification Search
CPC .. G09G 5/22; G09G 3/3453; G09G 2330/021; G09G 2370/04; G09G 2370/16; G01S 19/13; G06F 21/32
See application file for complete search history.

(56) References Cited

U.S. PATENT DOCUMENTS 6,429,785 B1 *  8/2002  Griffin ................. G01R 21/133
                                              340/661
2017/0032166 A1 *  2/2017  Raguin ................... G06F 3/033

FOREIGN PATENT DOCUMENTS

| CN | 204540321 U | 8/2015 |
| CN | 204904511 U | 12/2015 |
| CN | 205068456 U | 3/2016 |
| TW | 201445510 A | 12/2014 |

* cited by examiner

*Primary Examiner* — Dmitry Bolotin
(74) *Attorney, Agent, or Firm* — Muncy, Geissler, Olds & Lowe, P.C.

(57) ABSTRACT

An electronic paper display apparatus comprises an electronic paper display unit, a control unit electrically connected to the electronic paper display unit and including a power-level detection circuit, a storage unit at least storing an identification/alert information and electrically connected to the control unit, a wireless communication module and a power unit. The wireless communication module is electrically connected to the control unit and includes a satellite positioning receiving unit, which receives a current satellite positioning signal of the electronic paper display apparatus. The power unit is at least electrically connected to the power-level detection circuit of the control unit. When a power of the power unit is greater than or equal to a first power threshold and less than or equal to a second power threshold, the control unit loads the identification/alert information and a satellite positioning information in the storage unit into the electronic paper display unit.

17 Claims, 9 Drawing Sheets

ELECTRONIC PAPER DISPLAY APPARATUS

CROSS REFERENCE TO RELATED APPLICATIONS

This Non-provisional application claims priority under 35 U.S.C. §119(a) on Patent Application No(s). 105113570 filed in Taiwan, Republic of China on Apr. 29, 2016, the entire contents of which are hereby incorporated by reference.

BACKGROUND OF THE INVENTION

Field of Invention

The invention relates to an electronic paper display apparatus and, in particular, to an electronic paper display apparatus which can display an identification/alert information and a satellite positioning information or transmit a satellite positioning signal according to the power level.

Related Art

The electronic paper can give a user visual experience similar to the paper printing and writing and has a very small power consumption. The electronic paper, different from a general flat display such as LCD, can achieve the display function without a backlight module or a self-luminous source. That is, the electronic paper can have a display function without a backlight module or a self-luminous source. The electronic paper, just like a normal paper, can display by means of the environment light and therefore can be read with comfort. Besides, the image displayed by the electronic paper is clear and visible even under the sunlight. Moreover, the electronic paper has a very wide viewing angle and a much higher contrast than other display technologies. The effect of the electronic paper is almost the same as the printed newspapers. Hence, recently a lot of companies put much effort in the development of the electronic paper display apparatus. Besides, the electronic paper also can be applied to electronic tags, bus time charts, electronic boards, cell phone screens, E-book readers, or wearable electronic devices and so on.

The electronic paper is gradually applied widely and particularly applied to the wearable apparatus or the portable electronic apparatus in recent years. Because these products are manufactured in smaller, more compact and thinner size, they are easy to be lost and can not be easily found back, so it is easy to cause the user's loss of property or individual or confidential data leakage.

Therefore, it is an important subject to provide an electronic paper display apparatus which has an electronic paper display function and can be easily found back in the lost situation.

SUMMARY OF THE INVENTION

This invention provides an electronic paper display apparatus which can display an identification/alert information and a satellite positioning information or transmit a satellite positioning signal according to the power level and can be easily found back in the lost situation.

To achieve the above objective, an electronic paper display apparatus is provided and comprises an electronic paper display unit, a control unit, a storage unit, a wireless communication module and a power unit. The control unit is electrically connected to the electronic paper display unit and includes a power-level detection circuit. The storage unit at least stores an identification/alert information and is electrically connected to the control unit. The wireless communication module is electrically connected to the control unit and includes a satellite positioning receiving unit, which receives a current satellite positioning signal of the electronic paper display apparatus. The power unit is at least electrically connected to the power-level detection circuit of the control unit. When the power-level detection circuit detects a power of the power unit is greater than or equal to a first power threshold and less than or equal to a second power threshold, the control unit loads the identification/alert information and a satellite positioning information in the storage unit into the electronic paper display unit.

In an embodiment, the electronic paper display apparatus is a smart phone, a tablet computer, an E-book, a notebook computer, or a wearable electronic apparatus.

In an embodiment, the wireless communication module further includes a wireless transmission unit electrically connected to the control unit, when the power-level detection circuit detects the power of the power unit is greater than or equal to the first power threshold and less than or equal to the second power threshold, the wireless transmission unit transmits a satellite positioning signal corresponding to a location of the electronic paper display apparatus.

In an embodiment, a power within a power interval between the first power threshold and the second power threshold is the power required for the electronic paper display unit to update a display information for one time, and/or the power required for at least transmitting the satellite positioning signal corresponding to the location of the electronic paper display apparatus for one time.

In an embodiment, when the power-level detection circuit detects the power of the power unit is less than the first power threshold, the control unit controls the electronic paper display unit to continually display the identification/alert information and the satellite positioning information.

In an embodiment, when the power-level detection circuit detects the power of the power unit rises to being greater than or equal to the first power threshold and less than the second power threshold from the state of being less than the first power threshold, the control unit controls the wireless transmission unit to resend a satellite positioning signal corresponding to the location of the electronic paper display apparatus.

In an embodiment, when the power-level detection circuit detects the power of the power unit rises to being greater than or equal to the second power threshold from the state of being less than the second power threshold, the control unit controls the wireless transmission unit to send, at fixed intervals, the satellite positioning signal corresponding to the location of the electronic paper display apparatus.

In an embodiment, the control unit controls the storage unit to continually record the satellite positioning information of the electronic paper display apparatus.

In an embodiment, the electronic paper display apparatus further comprises an authentication unit at least electrically connected to the control unit and receiving an authentication identification information. When the authentication identification information is authenticated by the authentication unit, a display information of the electronic paper display unit is updated accordingly.

In an embodiment, the authentication identification information is password authentication information or biometric feature information.

In an embodiment, when the authentication identification information is authenticated by the authentication unit, the wireless transmission unit is stopped transmitting the satellite positioning signal corresponding to the location of the electronic paper display apparatus.

As mentioned above, the electronic paper display apparatus of this invention can display the identification/alert information and the satellite positioning information or transmit a satellite positioning signal according to the power level. That is, when the power of the power unit descends to within a preset range (greater than or equal to the first power threshold and less than or equal to the second power threshold), the control unit will load the identification/alert information and the satellite positioning information in the storage unit into the electronic paper display unit. Thereby, even if the electronic paper display apparatus is lost, these loaded identification/alert information and the satellite positioning information will be automatically displayed on the electronic paper display unit under the situation of the power of the power unit descending to within the preset range. Therefore, the person picking up the electronic paper display apparatus can conveniently contact the owner for the return.

Besides, when the electronic paper display apparatus includes the authentication unit and the authentication of the authentication unit is not done, the control unit can't make the electronic paper display unit update the display information accordingly. Hence, the information displayed on the electronic paper display unit can not be overwritten and changed by other people at this time. Thereby, even if the electronic paper display apparatus is lost, the security thereof also can be kept and the chance of finding back the apparatus can be thus increased.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
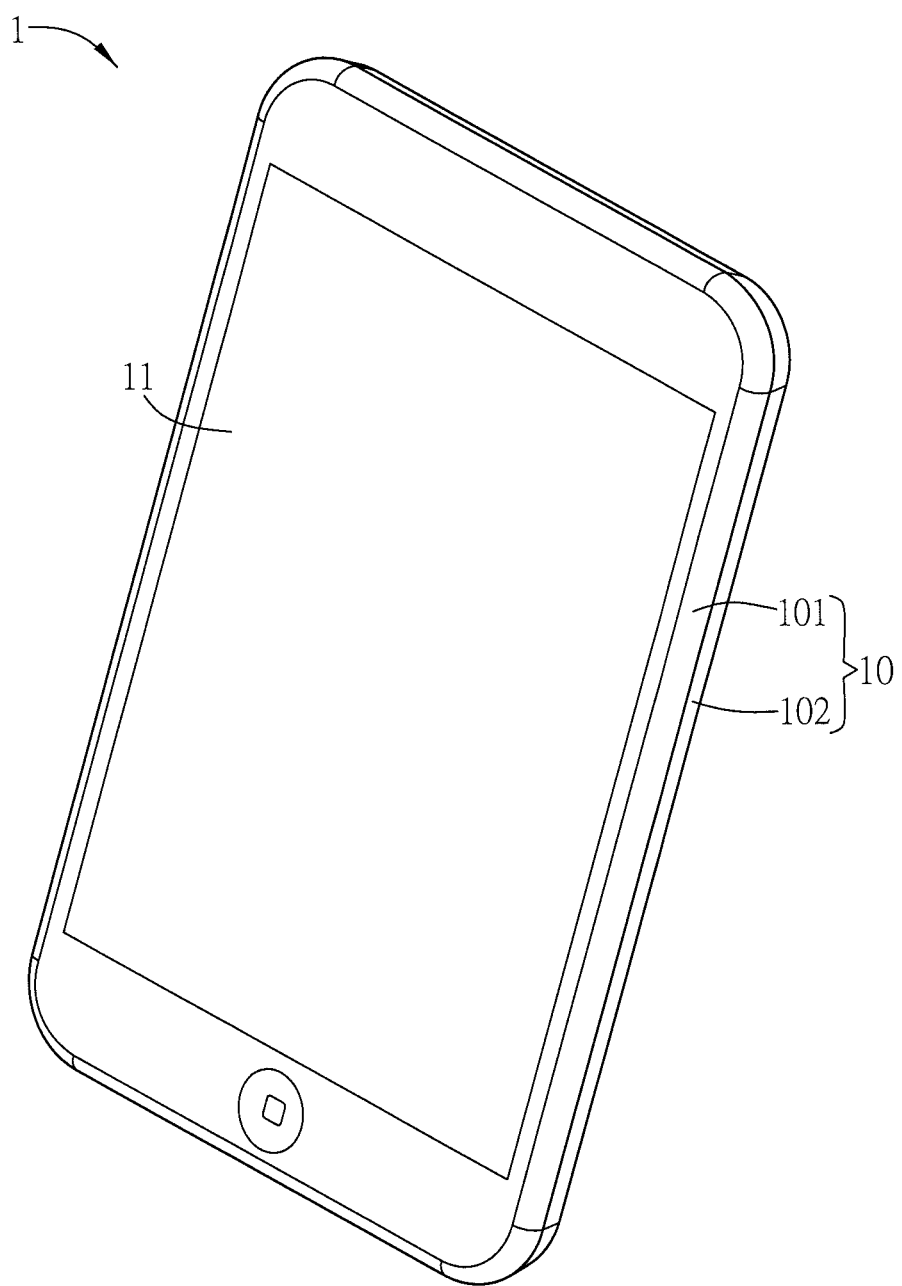
FIG. 1A is a schematic diagram of an electronic paper display apparatus of an embodiment of the present invention.
Figure 1B:
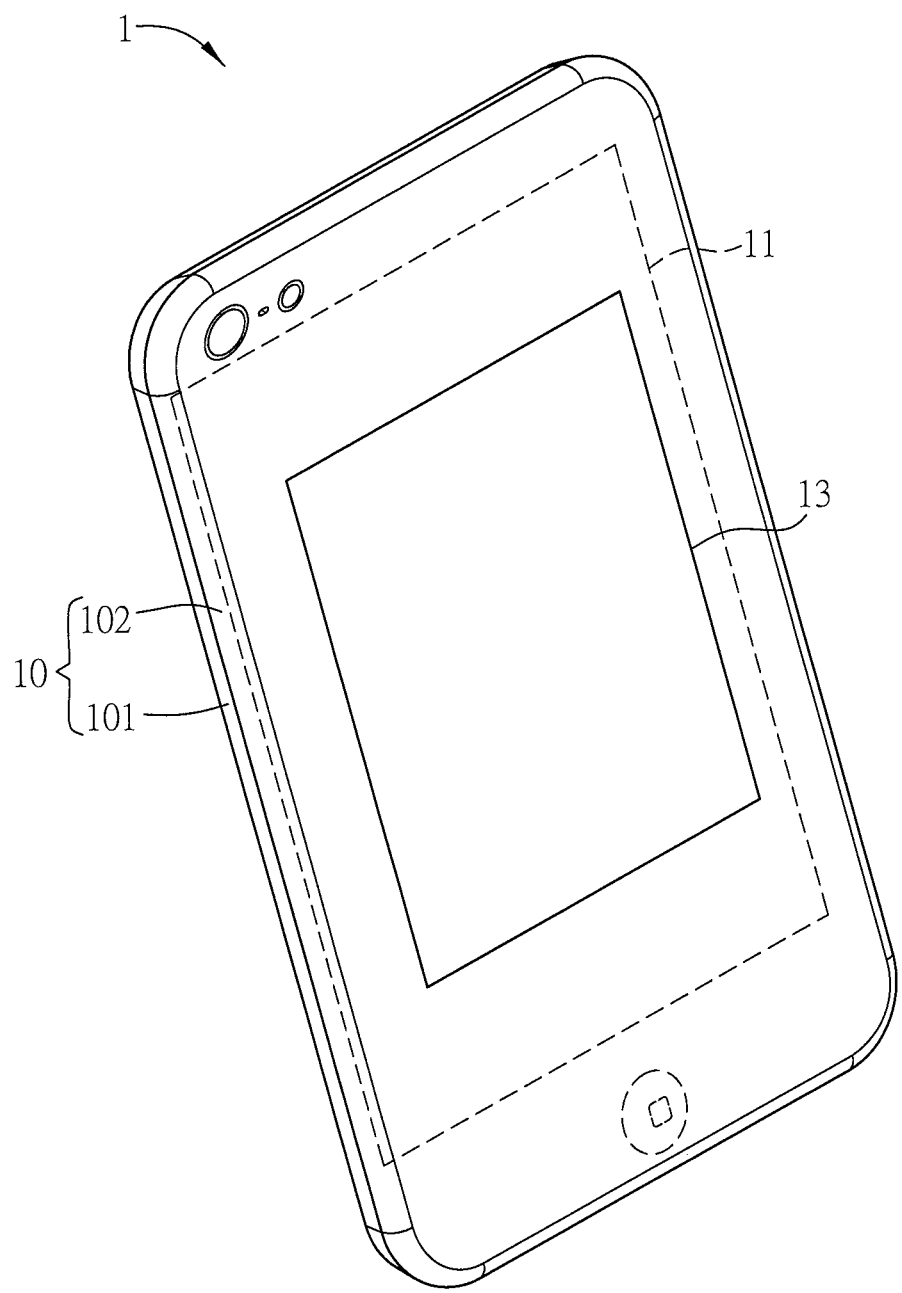
FIG. 1B is a schematic diagram of the back of the electronic paper display apparatus of FIG. 1A.
Figure 2:
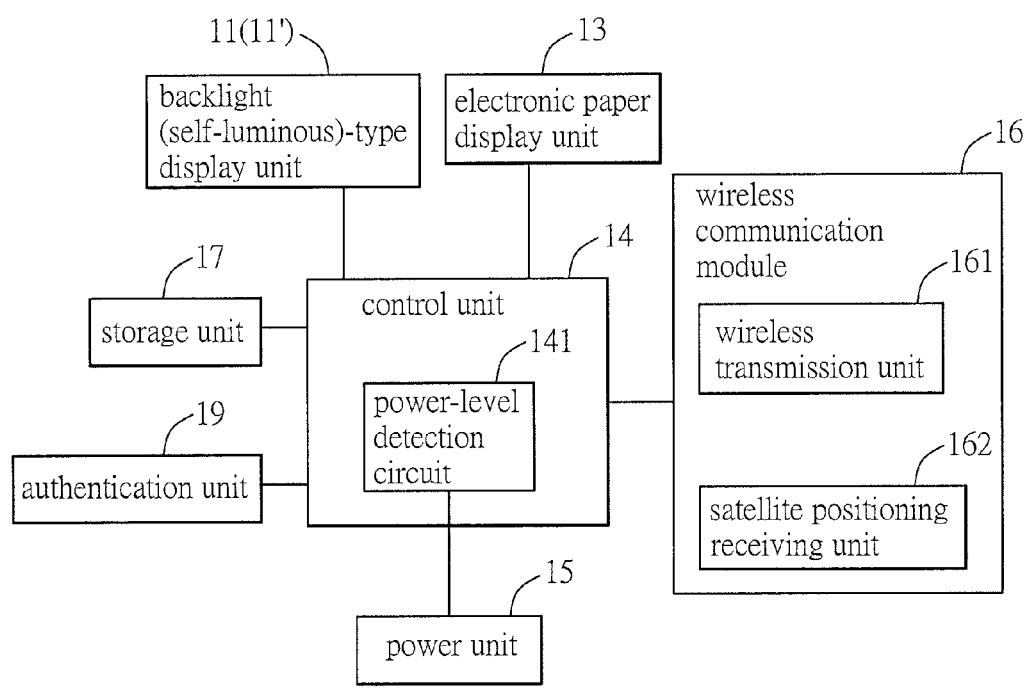
FIG. 2 is a schematic diagram of the system of the electronic paper display apparatus of FIG. 1A.

Please refer to FIGS. 1A to 2, wherein FIG. 1A is a schematic diagram of an electronic paper display apparatus of an embodiment of the present invention, FIG. 1B is a schematic diagram of the back of the electronic paper display apparatus of FIG. 1A, and FIG. 2 is a schematic diagram of the system of the electronic paper display apparatus of FIG. 1A. The electronic paper display apparatus 1 can be a portable electronic apparatus (such as a smart phone, a tablet computer, an E-book or a notebook computer) or a wearable electronic apparatus (such as an identity identification card). In this embodiment, the electronic paper display apparatus 1 is a smart phone for example for the following illustration.

The electronic paper display apparatus 1 of this embodiment includes a main body 10, a backlight-type display unit 11, an electronic paper display unit 13, a control unit 14, a power unit 15, a wireless communication module 16, a storage unit 17 and an authentication unit 19. The control unit 14 further includes a power-level detection circuit 141. The main body 10 includes a first casing 101 and a second casing 102, and the first casing 101 and the second casing 102 are disposed opposite to each other and form an accommodating space together. The backlight-type display unit 11 is disposed on the first casing 101, and the electronic paper display unit 13 is disposed on the second casing 102 which is opposite to the first casing 101. In this embodiment, the backlight-type display unit 11 denotes the display unit containing a backlight module, such as an LCD unit. In another embodiment, the backlight-type display unit 11 also can be replaced by a self-luminous display unit (such as an organic light-emitting display unit) 11'. For the convenient illustration, in the following embodiment the side of the electronic paper display apparatus 1 has the backlight-type display unit 11 disposed thereon is called the "front side", while the side of the electronic paper display apparatus 1 has the electronic paper display unit 13 disposed thereon is called the "back side". In other embodiments (such as E-books, wearable electronic apparatuses, or identity identification cards), the electronic paper display apparatus 1 may have no backlight-type display unit 11 but have the electronic paper display unit 13. However, this invention is not limited thereto.

In this embodiment, the electronic paper display unit 13 denotes the display unit using the bistable display technology, which means the display unit can retain the same image even when the voltage is not provided and the voltage is provided when the information displayed on the screen needs to be changed. So, the power consumption thereof is low and the quite low power is needed to display the desired information. In this embodiment, the electronic paper display unit 13 can use the electrophoretic technology (such as microcapsule type or microcup type), the electronic liquid powder display technology, the cholesteric liquid crystal display technology, the bistable nematic liquid crystal display technology or the electrowetting display technology.

The wireless communication module 16 includes a wireless transmission unit 161 and a satellite positioning receiving unit 162. In other embodiments, the wireless communication module 16, the storage unit 17 and/or the authentication unit 19 can be individually or collectively integrated in the control unit 14. This invention is not limited thereto.

The control unit 14, the power unit 15, the wireless communication module 16, the storage unit 17 and the authentication unit 19 can be disposed on the same circuit board (not shown), and the circuit board is disposed in the accommodating space formed by the first casing 101 and the second casing 102. The power unit 15 is at least electrically connected to the power-level detection circuit 141 of the control unit 14. The wireless transmission unit 161, the satellite positioning receiving unit 162 of the wireless communication module 16, the backlight-type display unit 11, the electronic paper display unit 13, the storage unit 17 and the authentication unit 19 are individually electrically connected to the control unit 14.

The control unit 14 at least includes a central processor or a microcontroller. The power-level detection circuit 141 also can be a power management IC to detect the power of the power unit 15 and adjust or distribute the power of the power unit 15 to other elements.

The satellite positioning receiving unit 162 receives the current satellite positioning signal (such as the signal transmitted by the satellite of the global positioning system) of the electronic paper display apparatus 1 and provides the current satellite positioning signal of the electronic paper display apparatus 1 for the control unit 14. The control unit 14 can compute the satellite positioning information 132 containing the physical position (i.e. the location, denoted by latitude and longitude for example) of the electronic paper display apparatus 1 according to the satellite positioning signal, and load the satellite positioning information 132 into the electronic paper display unit 13, so that the electronic paper display unit 13 displays the satellite positioning information 132 corresponding to the satellite positioning signal received by the satellite positioning receiving unit 162 (FIGS. 4A to 4D for example). Moreover, after the control unit 14 computes the satellite positioning information 132 containing the current physical position of the electronic paper display apparatus 1 according to the satellite positioning signal received by the satellite positioning receiving unit 162, the information needn't be loaded into electronic paper display unit 13 immediately. The control unit 14 also may store the satellite positioning information into the storage unit 17, and then the satellite positioning information 132 is controlled to be loaded into the electronic paper display unit 13 by the control unit 14 based on the following control method. Moreover, the control unit 14 also can control the storage unit 17 to continually record the satellite positioning information corresponding to the satellite positioning signal received by the satellite positioning receiving unit 162. That is, the control unit 14 will control the storage unit 17 to continually record the moving path of the electronic paper display apparatus 1.

In this embodiment, the satellite positioning signal denotes the satellite signal transmitted by the satellite of the global positioning system or the signal, transmitted by the wireless transmission unit, having the information representing the current location of the electronic paper display apparatus 1 or the physical location (such as latitude and longitude) where the electronic paper display apparatus 1 has been present. The satellite positioning information of this embodiment denotes the information, computed by the control unit 14 based on the satellite positioning signal, representing the current location of the electronic paper display apparatus 1 or the physical location (such as latitude and longitude) where the electronic paper display apparatus 1 has been present.

The storage unit 17 at least stores the identification/alert information 131 and/or the satellite positioning information 132 (FIG. 4A to 4D for example). The identification/alert information 131 can be a prompt or alert information (such as prompt or alert slogan), basic personnel information (such as phone number, address or name) and/or the product identification information of the electronic paper display apparatus 1 (such as product identification code, manufacturing date, warranty date or delivery address for maintenance). The identification/alert information 131 also can be inputted or specified by the user, and this invention is not limited thereto. The storage unit 17 is also used to store other display information (such as E-book information or picture information). The control unit 14 can load the identification/alert information 131 and other display information stored in the storage unit 17 into the electronic paper display unit 13. The wireless transmission unit 161 is used to transmit the signal loaded by the control unit 14.

When the control unit 14 loads the satellite positioning information 132 and the identification/alert information 131 into the electronic paper display unit 13, the control unit 14 can control the electronic paper display unit 13 not to be updated again. Therefore, the information displayed on the electronic paper display unit 13 can be retained and displayed. Besides, in order to strengthen the security, the electronic paper display apparatus 1 can be designed as that the information displayed on the electronic paper display unit 13 cannot be overwritten or changed before the authentication is certified. The related technology and operation of the authentication will be illustrated in the following embodiments.

Figure 3:
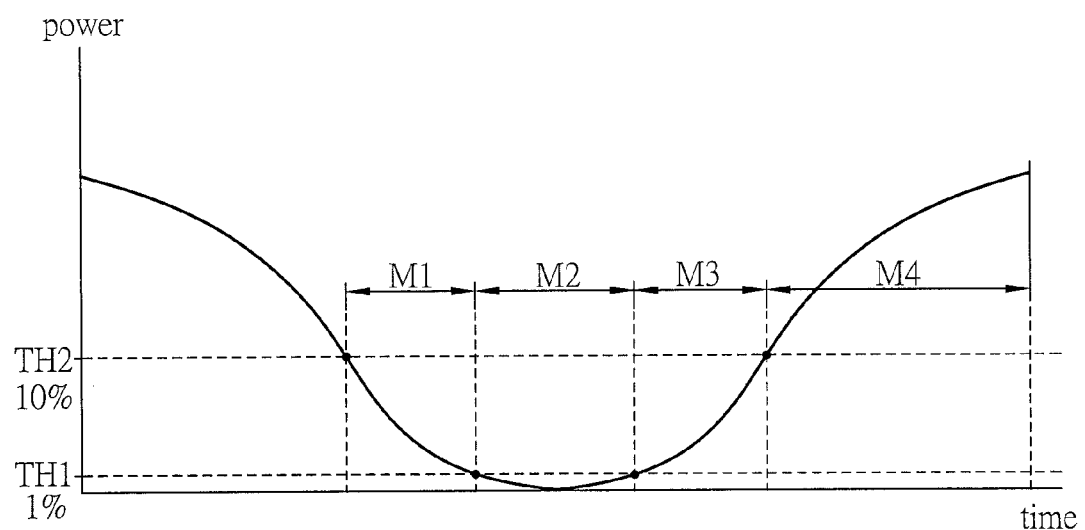
FIG. 3 is a schematic diagram showing the power of the power unit of the electronic paper display apparatus of FIG. 1A to time.
Figure 4A:
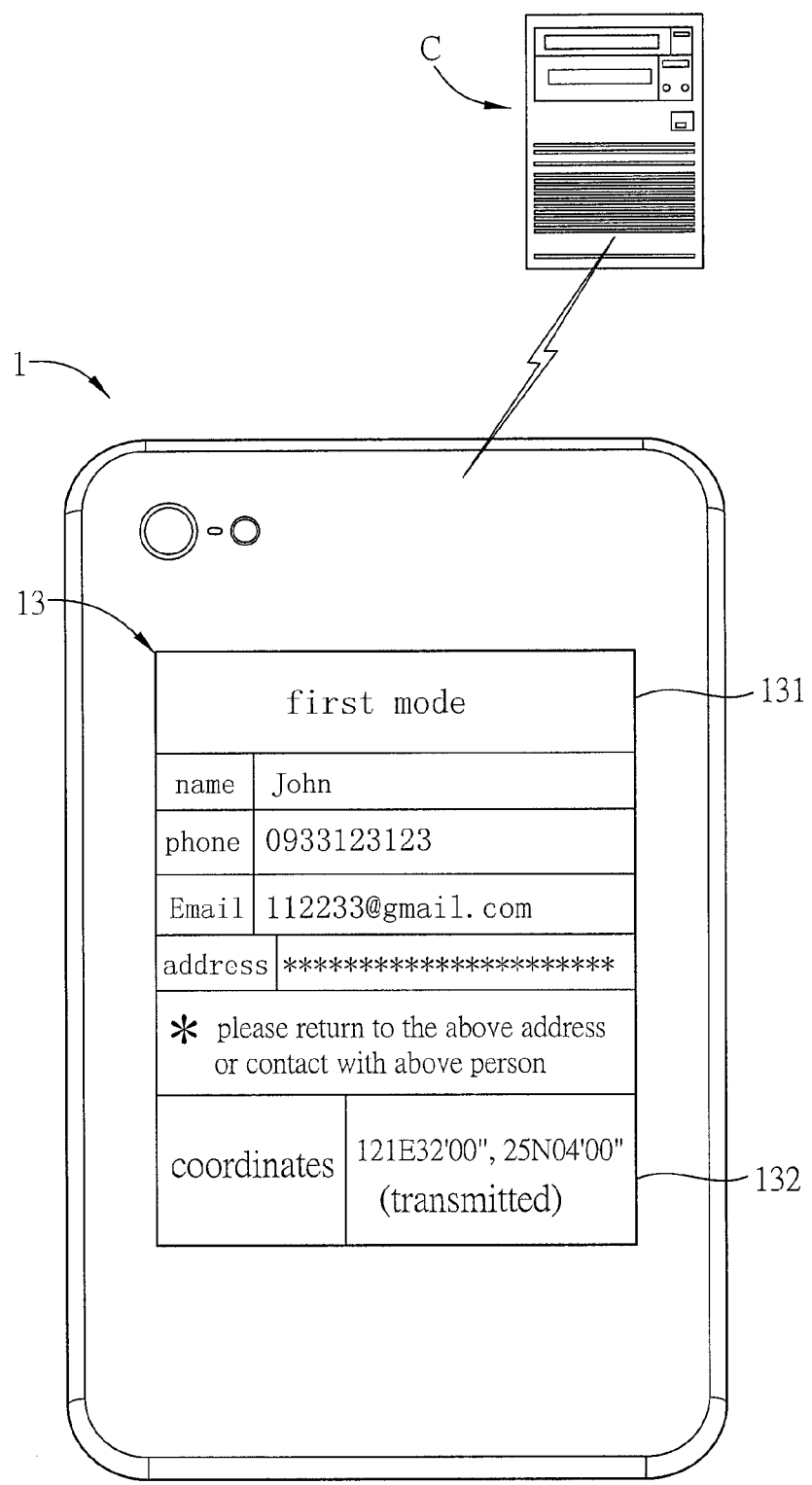
FIG. 4A is a schematic diagram showing the electronic paper display apparatus of FIG. 1B displaying information and transmitting signals under the first mode.
Figure 4B:
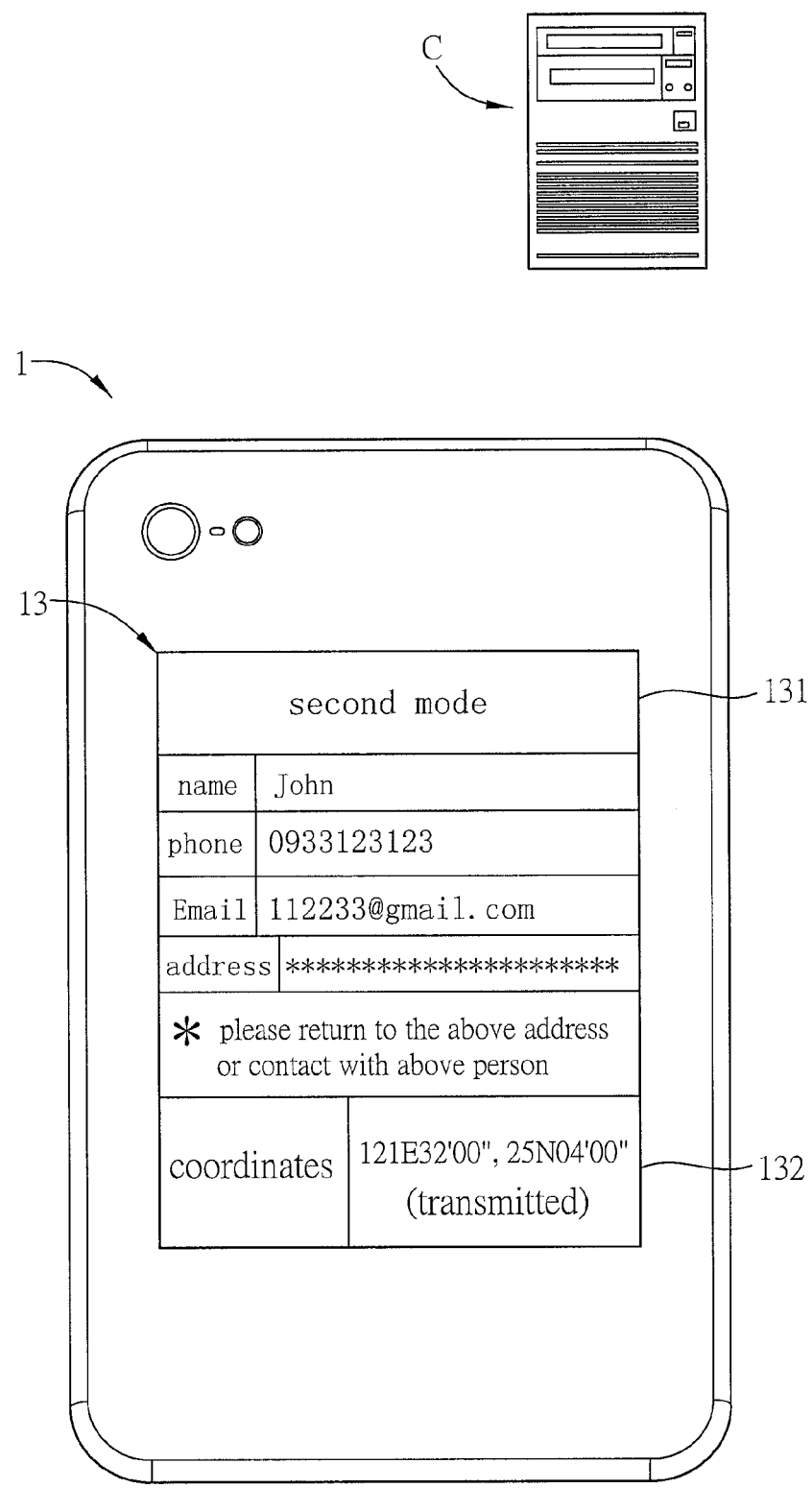
FIG. 4B is a schematic diagram showing the electronic paper display apparatus of FIG. 1B displaying information under the second mode.
Figure 4C:
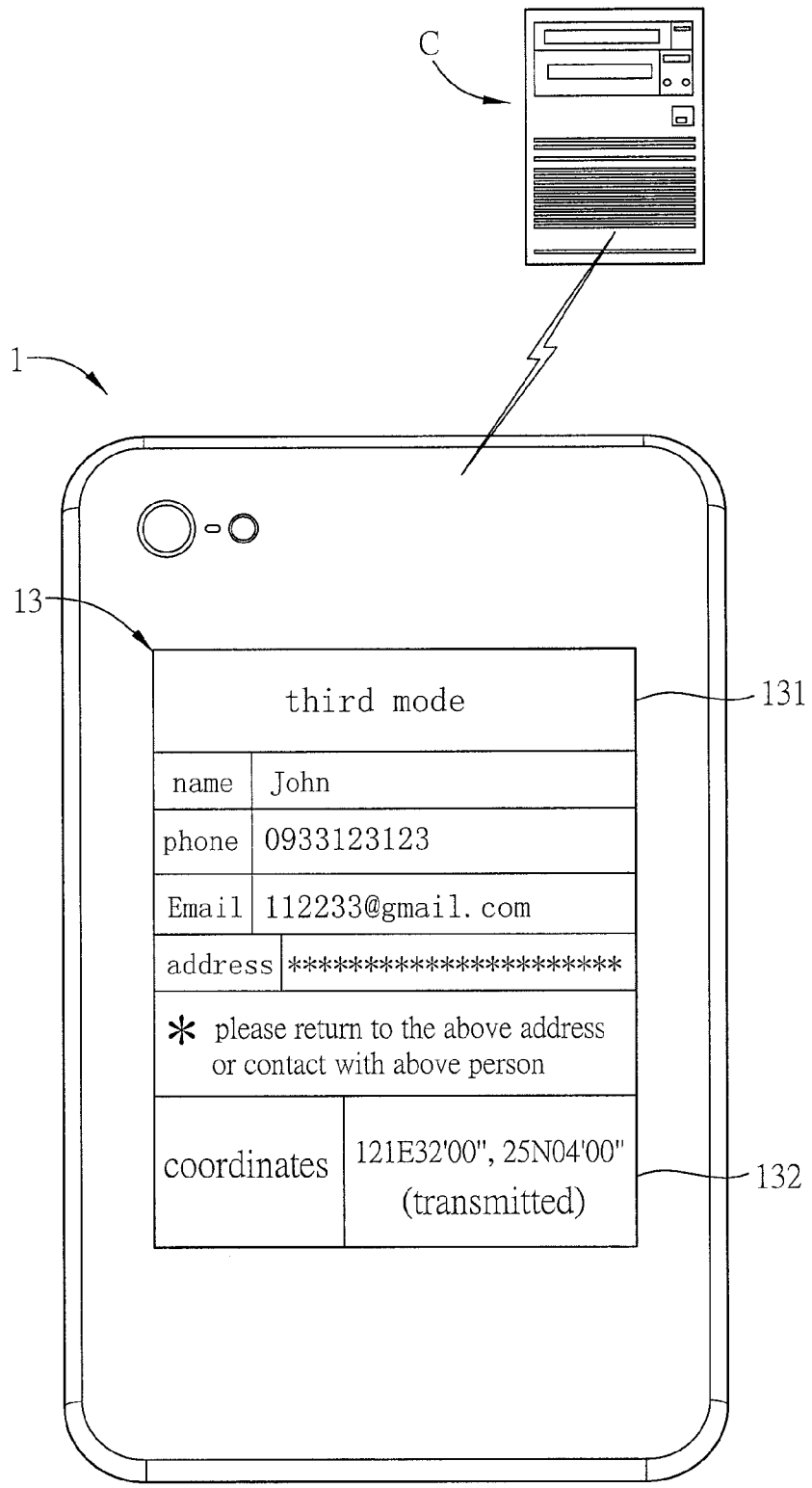
FIG. 4C is a schematic diagram showing the electronic paper display apparatus of FIG. 1B displaying information and transmitting signals under the third mode.
Figure 4D:
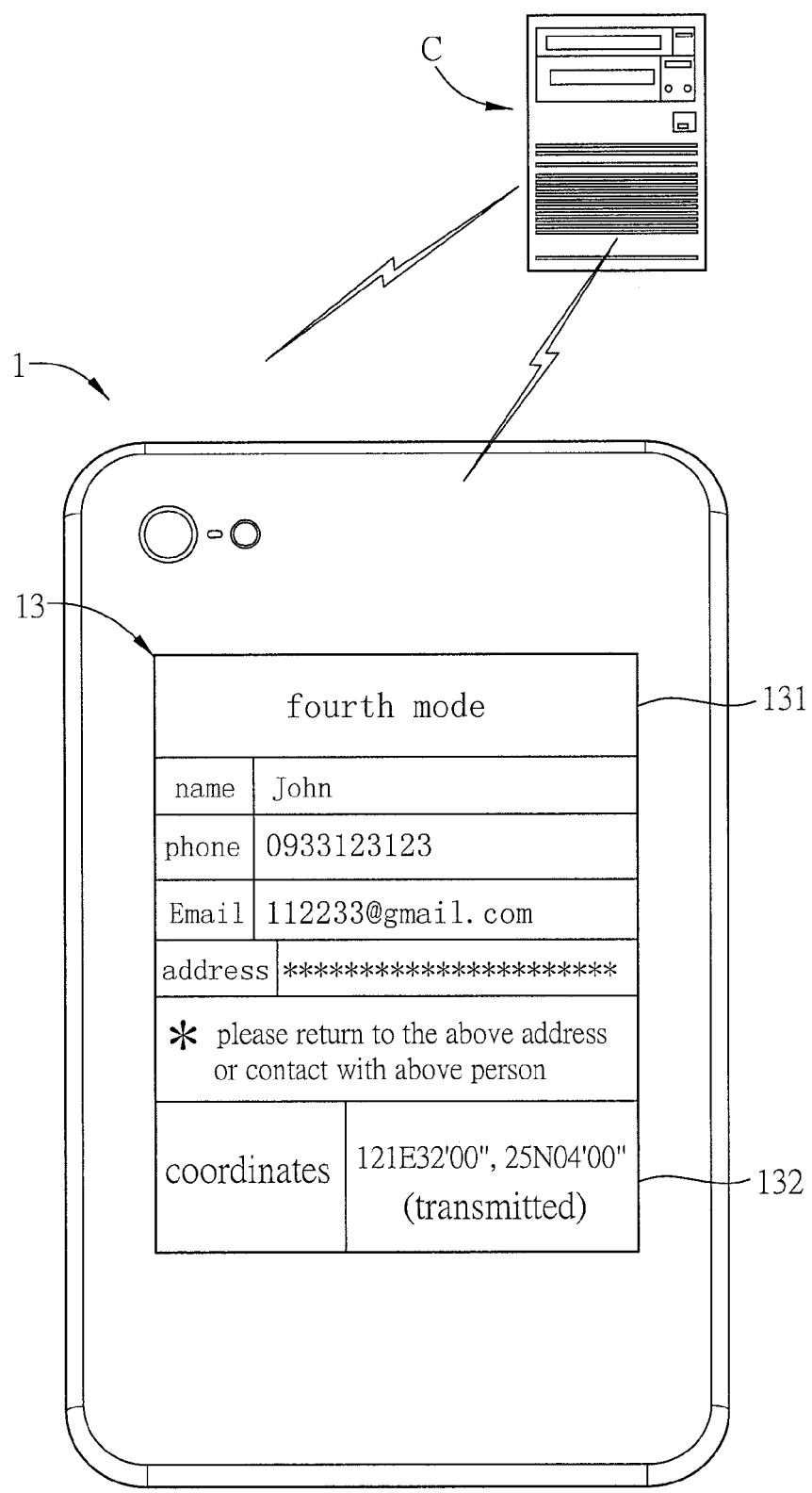
FIG. 4D is a schematic diagram showing the electronic paper display apparatus of FIG. 1B displaying information and transmitting signals under the fourth mode.

Please refer to FIGS. 3 to 4D, and four operation modes of the electronic paper display apparatus 1 will be illustrated. FIG. 3 is a schematic diagram showing the power of the power unit 15 of the electronic paper display apparatus 1 of FIG. 1A to time. FIG. 4A is a schematic diagram showing the electronic paper display apparatus of FIG. 1B displaying information and transmitting signals under the first mode. FIG. 4B is a schematic diagram showing the electronic paper display apparatus of FIG. 1B displaying information under the second mode. FIG. 4C is a schematic diagram showing the electronic paper display apparatus of FIG. 1B displaying information and transmitting signals under the third mode. FIG. 4D is a schematic diagram showing the electronic paper display apparatus of FIG. 1B displaying information and transmitting signals under the fourth mode.

As shown in FIGS. 3 to 4D, in this embodiment, when the power-level detection circuit 141 detects that the power of the power unit 15 is greater than or equal to a first power threshold TH1 and less than or equal to a second power threshold TH2, the electronic paper display apparatus 1 goes into the first mode M1 and the control unit 14 loads the identification/alert information 131 and the satellite positioning information 132 into the electronic paper display unit 13. That is, when the power of the power unit 15 is greater than or equal to a first power threshold TH1 and less than or equal to a second power threshold TH2, the electronic paper display unit 13 displays the identification/alert information 131 and the satellite positioning information 132. The position where the identification/alert information 131 and the satellite positioning information 132 are displayed on the electronic paper display unit 13 can be adjusted according to the requirement, and this invention is not limited thereto.

Moreover, in this embodiment, the power within a power interval between the first power threshold TH1 and the second power threshold TH2 is the power required for the electronic paper display unit 13 to update the display information (including the identification/alert information 131 and the satellite positioning information 132) for one time. The first power threshold TH1 and the second power threshold TH2 can be adjusted according to the requirement and this invention is not limited thereto. For example, the first power threshold TH1 can be 1% of the total power or maximum stored power of the power unit 15, and the second power threshold TH2 can be 20% of the total power or maximum stored power of the power unit 15. In other embodiments, the first power threshold TH1 also may be 3% of the total power or maximum stored power of the power unit 15, and the second power threshold TH2 may be adjusted as 15% or 10% of the total power or maximum stored power of the power unit 15.

Under the first mode M1 (when the power-level detection circuit 141 detects that the power of the power unit 15 is greater than or equal to a first power threshold TH1 and less than or equal to a second power threshold TH2), the control unit 14 can load the identification/alert information 131 and the satellite positioning information 132 of the electronic paper display apparatus 1 into the electronic paper display unit 13, so that the electronic paper display unit 13 can display the identification/alert information 131 and the satellite positioning information 132. Meanwhile, the control unit 14 also controls the wireless transmission unit 161 to transmit the satellite positioning signal corresponding to the location of the electronic paper display apparatus 1 (the satellite positioning signal denotes the signal having the information representing the current location of the electronic paper display apparatus 1 or the physical location where the electronic paper display apparatus 1 has been present). So, in this time, the power within the power interval between the first power threshold TH1 and the second power threshold TH2 is the power required for the wireless transmission unit 161 to at least transmit the satellite positioning signal of the electronic paper display apparatus 1 for one time and also required for the electronic paper display unit 13 to update the display information (including the identification/alert information 131 and the satellite positioning information 132) for one time.

The satellite positioning signal and the identification/alert information 131 of the electronic paper display apparatus 1 transmitted by the wireless transmission unit 161 can be received by another electronic apparatus C. Thereby, the owner of the electronic paper display apparatus 1 or another person can know the current location of the electronic paper display apparatus 1 or the physical location where the electronic paper display apparatus 1 has been present at a certain time.

The electronic apparatus C can be a remote server, another mobile apparatus (such as a tablet computer or a smart phone) or a personal computer (a desktop computer or a notebook computer). The wireless transmission unit 161 can transmit the identification/alert information 131 and/or the satellite positioning signal of the electronic paper display apparatus 1 to the electronic apparatus C by using e-mail, text message, or short message service (SMS) (such as LINE, WeChat, or Facebook).

When the electronic paper display apparatus 1 goes into the first mode M1 and does not be charged and the power unit 15 continually consumes the power, the electronic paper display apparatus 1 will go to the second mode M2. That is, when the power-level detection circuit 141 of the electronic paper display apparatus 1 detects the power of the power unit 15 is less than the first power threshold TH1, the electronic paper display apparatus goes into the second mode M2 and the control unit 14 controls the electronic paper display unit 13 to continually display the identification/alert information 131 and the satellite positioning information 132. That is, even when the power is used up or about to be used up, the identification/alert information 131 and the satellite positioning information 132 are still displayed on the electronic paper display unit 13. Therefore, even if the electronic paper display apparatus 1 is picked up by someone when the power is used up, the one picking up the electronic paper display apparatus 1 also can know the owner of the electronic paper display apparatus 1 and the contact information through the identification/alert information 131 displayed on the electronic paper display unit 13 so as to contact the owner of the electronic paper display apparatus 1. Besides, the satellite positioning information 132 displayed on the electronic paper display unit 13 also can remind the one picking up the electronic paper display apparatus 1 that the owner of the electronic paper display apparatus 1 or someone may have known the current location of the electronic paper display apparatus 1, so as to weaken the picker's motive of encroaching the electronic paper display apparatus 1.

Then, if the electronic paper display apparatus 1 is reconnected to the power for the charge again under the second mode M2 so as to make the power of the power unit 15 rise again to between the first power threshold TH1 and the second power threshold TH2, the electronic paper display apparatus 1 will go into the third mode M3. That is, when the power-level detection circuit 141 detects the power of the power unit 15 rises to being greater than or equal to the first power threshold Th1 and less than the second power threshold TH2 from the state of being less than the first power threshold TH1, the control unit 14 controls the wireless transmission unit 161 to resend another satellite positioning signal corresponding to the location of the electronic paper display apparatus 1 and/or the identification/alert information 131, which also can be received by the electronic apparatus C, so that the owner of the electronic paper display apparatus 1 or someone can know again the current location of the electronic paper display apparatus 1 or the physical location where the electronic paper display apparatus 1 has been present at a certain time through the electronic apparatus C.

Then, if the electronic paper display apparatus 1 is continually charged under the third mode M3 so that the power of the power unit 15 rises to being greater than or equal to the second power threshold TH2, the electronic paper display apparatus 1 will go into the fourth mode M4. That is, when the power-level detection circuit 141 detects the power of the power unit 15 rises to being greater than or equal to the second power threshold TH2 from the state of being less than the second power threshold TH2, the control unit 14 controls the wireless transmission unit 161 to send, at fixed intervals, the satellite positioning signal corresponding to the location of the electronic paper display apparatus 1 and/or the identification/alert information 131, which also can be received by the electronic apparatus C, so that the owner of the electronic paper display apparatus 1 or someone can know, at fixed intervals, the current location of the electronic paper display apparatus 1 or the physical location where the electronic paper display apparatus 1 has been present at a certain time through the electronic apparatus C. Thereby, the owner of the electronic paper display apparatus 1 or someone can track the electronic paper display apparatus 1, so as to increase the chance of finding back the electronic paper display apparatus 1.

Because the control unit 14 controls the storage unit 17 to continually record the moving path of the electronic paper display apparatus 1, the another satellite positioning signal of the electronic paper display apparatus 1 resent by the wireless transmission unit 161 also can include the information of the moving path of the electronic paper display apparatus 1 which the control unit 14 controls the storage unit 17 to record. In this situation, even if the physical location where the electronic paper display apparatus 1 is present in a certain mode is different from the physical location where the electronic paper display apparatus 1 is present in a previous mode (which denotes the electronic paper display apparatus 1 has been moved), the owner of the electronic paper display apparatus 1 or someone also can know the last location of the electronic paper display apparatus 1 thereby.

Moreover, in order to enhance the security, the electronic paper display apparatus 1 of this embodiment can further include an authentication unit 19. The authentication unit 19 is at least electrically connected to the control unit 14 and receives the authentication identification information which is inputted by the user. When the authentication identification information is authenticated by the authentication unit 19, a message will be sent to inform the control unit 14, so the control unit 14 can update the display information displayed by the electronic paper display unit 13 accordingly and also can make the wireless transmission unit 161 stop transmitting the satellite positioning signal corresponding to the location of the electronic paper display apparatus 1. That the display information displayed by the electronic paper display unit 13 is updated denotes that contents of the displayed identification/alert information 131 and the satellite positioning information 132 are changed or that the electronic paper display unit 13 is stopped or shut down so that the electronic paper display unit 13 won't display any identification/alert information 131 and the satellite positioning information 132. Moreover, the authentication identification information can be password authentication information inputted by the user, such as a password including English letters and numbers, or the biological data identification information of the user, such as fingerprints, irises, palm prints, facial features or other biometric authentication information. In this embodiment, the authentication identification control conducted by the cooperation of the authentication unit 19 and the control unit 14 can be performed under at least one of the first mode M1, the third mode M3 and the fourth mode M4.

Figure 5:
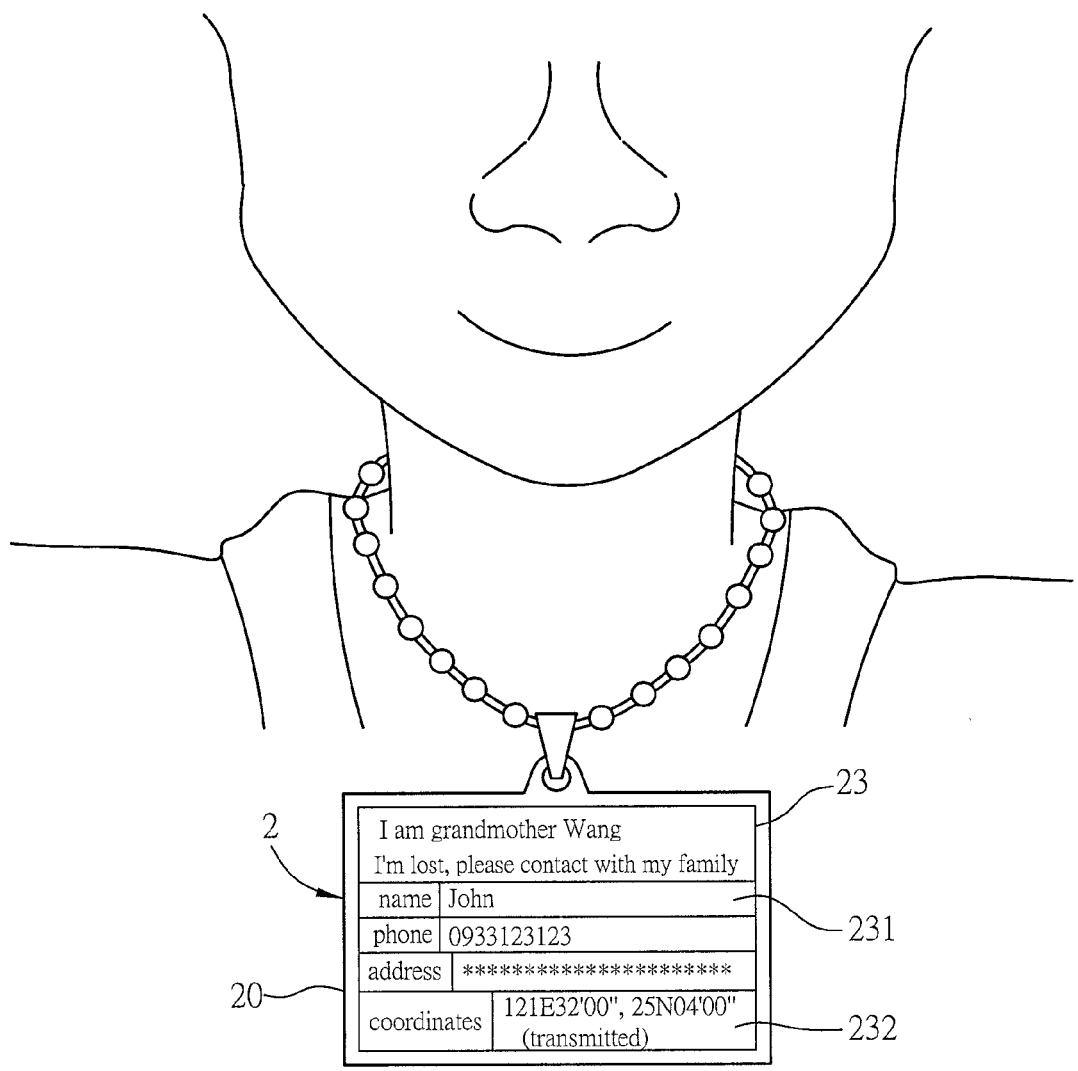
FIG. 5 is a schematic diagram of an electronic paper display apparatus of another embodiment of the present invention.

Another embodiment is also disclosed, which is also an electronic paper display apparatus, as shown in FIG. 5. In FIG. 5, the electronic paper display apparatus 2 is made as an identity identification card, so as to be worn appropriately on the children, intellectual disabled, or the elders with retarded identification or intelligence. The electronic paper display apparatus 2 includes a main body 20, an electronic paper display unit 23, a control unit, a power unit, a wireless communication module and a storage unit. In comparison with the electronic paper display apparatus 1 of FIG. 1A to FIG. 4D, the electronic paper display apparatus 2 is made as an identity identification card while the electronic paper display apparatus 1 is a smart phone for example, so the electronic paper display apparatus 2 needn't be equipped with a backlight-type display unit or a self-luminous display unit. The control unit, the power unit, the wireless communication module and the storage unit of the electronic paper display apparatus 2 are the same as the control unit 14, the power unit 15, the wireless communication module 16 and the storage unit 17 of the electronic paper display apparatus 1 in the connection relationship, the detailed features and the operation modes, so the related illustration is omitted here for conciseness. Therefore, similarly in this embodiment, the control unit is electrically connected to the electronic paper display unit and further includes a power-level detection circuit; the storage unit is electrically connected to the control unit and at least stores the identification/alert information 231; the satellite positioning receiving unit is electrically connected to the control unit and receives the current satellite positioning signal of the electronic paper display apparatus 2; the power unit is at least electrically connected to the power-level detection circuit of the control unit; and when the power-level detection circuit detects the power of the power unit is greater than or equal to a first power threshold and less than or equal to a second power threshold, the control unit loads the identification/alert information 231 and the satellite positioning information 232 into the electronic paper display unit 23. Thereby, when the children, intellectual disabled, or the elders with retarded identification or intelligence wearing the electronic paper display apparatus 2 is lost or go astray, other people can rapidly know the basic information of the wearer and who to be contacted, so that the lost children, intellectual disabled, or the elders with retarded identification or intelligence can be rapidly and easily found back.

In summary, the electronic paper display apparatus of this invention can display the identification/alert information and the satellite positioning information or transmit a satellite positioning signal according to the power level. That is, when the power of the power unit descends to within a preset range (greater than or equal to the first power threshold and less than or equal to the second power threshold), the control unit will load the identification/alert information and the satellite positioning information in the storage unit into the electronic paper display unit. Thereby, even if the electronic paper display apparatus is lost or the one wearing the electronic paper display apparatus is lost, these loaded identification/alert information and the satellite positioning information will be automatically displayed on the electronic paper display unit under the situation of the power of the power unit descending to within the preset range. Therefore, the person picking up the electronic paper display apparatus can conveniently contact the owner for the return or conveniently contact the related person to give back the person wearing the electronic paper display apparatus.

Besides, when the electronic paper display apparatus includes the authentication unit and the authentication of the authentication unit is not done, the control unit can't make the electronic paper display unit update the display information accordingly. Hence, the information displayed on the electronic paper display unit can not be overwritten and changed by other people at this time. Thereby, even if the electronic paper display apparatus is lost, the security thereof also can be kept and the chance of finding back the apparatus can be thus increased.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electronic paper display apparatus, comprising:
   an electronic paper display unit;
   a control unit electrically connected to the electronic paper display unit and including a power-level detection circuit;
   a storage unit electrically connected to the control unit and at least storing an identification/alert information;
   a wireless communication module electrically connected to the control unit and including a satellite positioning receiving unit, which receives a current satellite positioning signal of the electronic paper display apparatus; and a power unit at least electrically connected to the power-level detection circuit of the control unit;

wherein when the power-level detection circuit detects a power of the power unit is greater than or equal to a first power threshold and less than or equal to a second power threshold, the control unit loads the identification/alert information and a satellite positioning information generated according to the satellite positioning signal into the electronic paper display unit.

2. The electronic paper display apparatus as recited in claim 1, which is a smart phone, a tablet computer, an E-book, a notebook computer, or a wearable electronic apparatus.

3. The electronic paper display apparatus as recited in claim 1, wherein the wireless communication module further includes a wireless transmission unit electrically connected to the control unit, when the power-level detection circuit detects the power of the power unit is greater than or equal to the first power threshold and less than or equal to the second power threshold, the wireless transmission unit transmits a satellite positioning signal corresponding to a location of the electronic paper display apparatus.

4. The electronic paper display apparatus as recited in claim 3, wherein a power within a power interval between the first power threshold and the second power threshold is the power required for the electronic paper display unit to update a display information for one time, and/or the power required for at least transmitting the satellite positioning signal corresponding to the location of the electronic paper display apparatus for one time.

5. The electronic paper display apparatus as recited in claim 3, wherein when the power-level detection circuit detects the power of the power unit is less than the first power threshold, the control unit controls the electronic paper display unit to continually display the identification/alert information and the satellite positioning information.

6. The electronic paper display apparatus as recited in claim 3, wherein when the power-level detection circuit detects the power of the power unit rises to being greater than or equal to the first power threshold and less than the second power threshold from the state of being less than the first power threshold, the control unit controls the wireless transmission unit to resend a satellite positioning signal corresponding to the location of the electronic paper display apparatus.

7. The electronic paper display apparatus as recited in claim 6, further comprising:

an authentication unit at least electrically connected to the control unit and receiving an authentication identification information, wherein when the authentication identification information is authenticated by the authentication unit, the control unit updates a display information of the electronic paper display unit.

8. The electronic paper display apparatus as recited in claim 7, wherein the authentication identification information is password authentication information or biometric feature information.

9. The electronic paper display apparatus as recited in claim 7, wherein when the authentication identification information is authenticated by the authentication unit, the wireless transmission unit is stopped transmitting the satellite positioning signal corresponding to the location of the electronic paper display apparatus.

10. The electronic paper display apparatus as recited in claim 3, wherein when the power-level detection circuit detects the power of the power unit rises to being greater than or equal to the second power threshold from the state of being less than the second power threshold, the control unit controls the wireless transmission unit to send, at fixed intervals, the satellite positioning signal corresponding to the location of the electronic paper display apparatus.

11. The electronic paper display apparatus as recited in claim 10, further comprising:

an authentication unit at least electrically connected to the control unit and receiving an authentication identification information, wherein when the authentication identification information is authenticated by the authentication unit, the control unit updates a display information of the electronic paper display unit.

12. The electronic paper display apparatus as recited in claim 11, wherein the authentication identification information is password authentication information or biometric feature information.

13. The electronic paper display apparatus as recited in claim 11, wherein when the authentication identification information is authenticated by the authentication unit, the wireless transmission unit is stopped transmitting the satellite positioning signal corresponding to the location of the electronic paper display apparatus.

14. The electronic paper display apparatus as recited in claim 1, wherein a power within a power interval between the first power threshold and the second power threshold is the power required for the electronic paper display unit to update a display information for one time, and/or the power required for at least transmitting the satellite positioning signal corresponding to the location of the electronic paper display apparatus for one time.

15. The electronic paper display apparatus as recited in claim 1, wherein the control unit controls the storage unit to continually record the satellite positioning information of the electronic paper display apparatus.

16. The electronic paper display apparatus as recited in claim 1, further comprising:

an authentication unit at least electrically connected to the control unit and receiving an authentication identification information, wherein when the authentication identification information is authenticated by the authentication unit, the control unit updates a display information of the electronic paper display unit.

17. The electronic paper display apparatus as recited in claim 16, wherein the authentication identification information is password authentication information or biometric feature information.

* * * * *